United States Patent

Tracy

[15] 3,687,216
[45] Aug. 29, 1972

[54] VEHICLE ANTI-THEFT DEVICE

[72] Inventor: Richard A. Tracy, Sparks, Nev.

[73] Assignees: Birgit K. Preston; Charles V. Prather, Reno, Nev. ; part interest to each

[22] Filed: March 18, 1970

[21] Appl. No.: 20,749

[52] U.S. Cl............180/114, 123/198 B, 251/137, 251/139
[51] Int. Cl.............................................B60r 25/04
[58] Field of Search...........180/114, 82; 123/198 B, 123/198 DC, 198 R; 137/361; 251/137, 139; 70/24; 303/89; 307/10 AT

[56] References Cited

UNITED STATES PATENTS

| 3,559,755 | 2/1971 | Pond................180/114 |
| 2,022,725 | 12/1935 | Lazarus et al............123/198 |
| 3,125,321 | 3/1964 | Van Domelen...........251/139 |
| 3,174,502 | 3/1965 | Howarth et al............137/351 |
| 3,354,980 | 11/1967 | Nielsen.................180/114 |
| 2,695,685 | 11/1954 | Jamison..............180/114 X |
| 2,964,286 | 12/1960 | Hoskins...............251/139 X |
| 3,231,233 | 1/1966 | Herion.....................251/139 |
| 3,415,487 | 12/1968 | Robarge..................251/137 |

*Primary Examiner*—Kenneth H. Betts
*Attorney*—Clarence A. O'Brien and Harvey B. Jacobson

[57] ABSTRACT

A fuel line mounted normally closed solenoid actuated cut-off valve disposed intermediate the fuel tank and the fuel pump of an associated vehicle engine. The solenoid actuated cut-off valve is electrically connected to the accessory terminal of the associated ignition switch rather than the ignition terminal and therefore, should the ignition system of the vehicle be "hot-wired" by a thief, the solenoid actuated cut-off valve will not be opened and the engine of the vehicle will stall for lack of fuel in a short period of time after being "hot-wired."

5 Claims, 4 Drawing Figures

PATENTED AUG 29 1972

Richard A. Tracy
INVENTOR.

BY *Clarence A. O'Brien*
*and Harvey B. Jacobson*
Attorneys

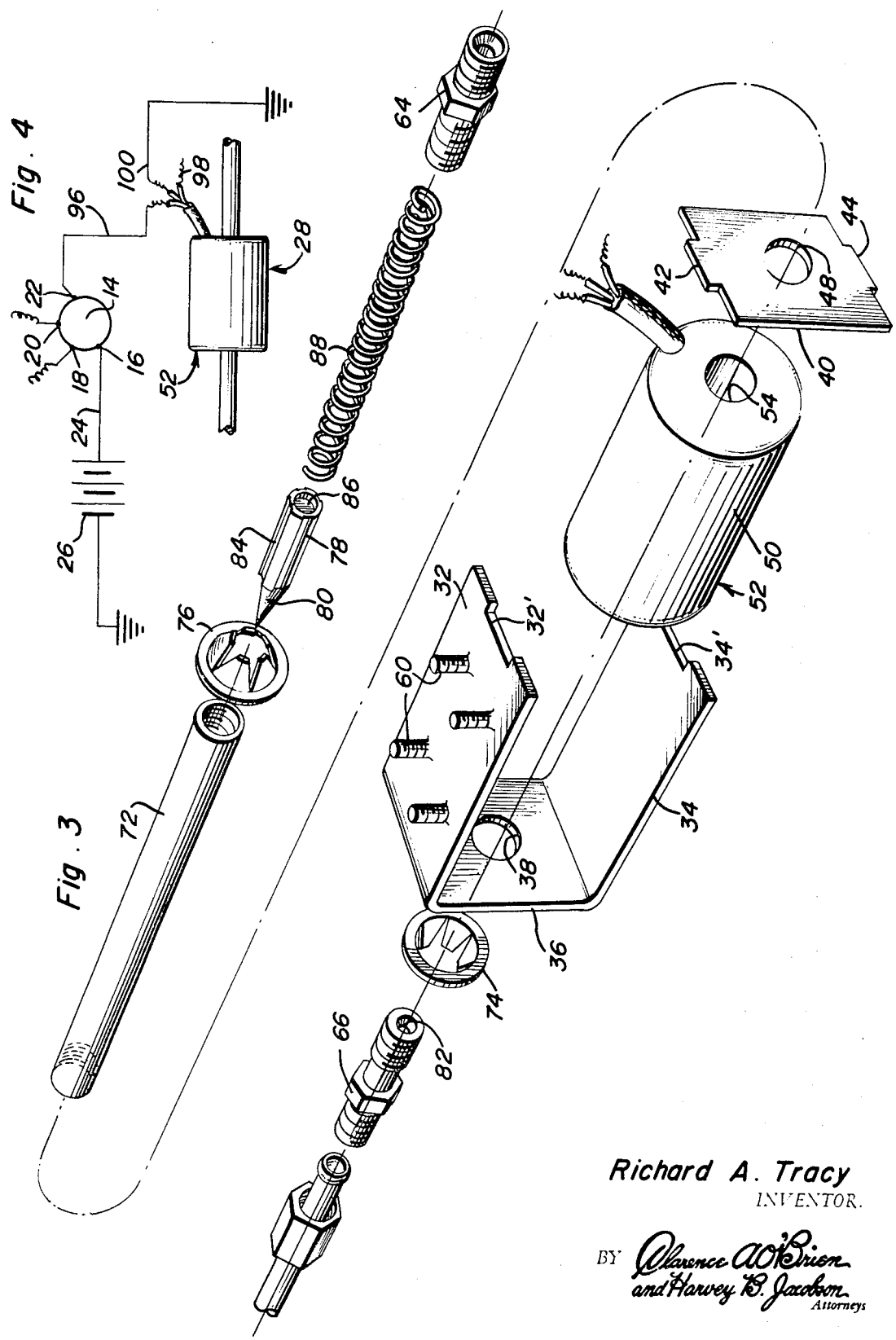

VEHICLE ANTI-THEFT DEVICE

The anti-theft device comprising the present invention has been designed to provide a relatively inexpensive means of preventing a vehicle from being stolen by a car thief who hot-wires the ignition circuit of a vehicle equipped with the anti-theft device of the instant invention.

The anti-theft device operates in a manner such that a thief successfully hot-wiring the ignition circuit of a vehicle may start the engine of the vehicle and proceed only a short distance before the vehicle will apparently run out of gas and thus the anti-theft device discourages any further attempt on the part of the thief to steal the vehicle.

The anti-theft device comprises a normally closed solenoid actuated fuel valve to be disposed in the fuel line intermediate the fuel tank and the fuel pump and the solenoid of the control valve is connected to the "accessory side" of the ignition switch as opposed to the ignition terminal of the ignition switch whereby an attempt at hot-wiring the ignition circuit of an associated vehicle will fail to actuate the control valve and thus allow the associated engine to run only a short period of time after being started as a result of hot-wiring the ignition circuit.

The main object of this invention is to provide a vehicle anti-theft device which will function to terminate operation of an internal combustion engine shortly after the engine has been started by "hot-wiring" its ignition circuit.

Still another object of this invention is to provide an anti-theft device constructed in a manner whereby it may be readily mounted on substantially all types of motor vehicles utilizing liquid fuel.

Another important object of this invention is to provide a vehicle anti-theft device which will have a discouraging effect upon a person who has successfully hot-wired the ignition switch of a motor vehicle for the purpose of stealing the vehicle.

A final object of this invention to be specifically enumerated herein is to provide a vehicle anti-theft device which will conform to conventional forms of manufacture, be of simple construction and easy to install so as to provide a device that will be economically feasible, long lasting and relatively troublefree in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an exploded perspective view of the anti-theft device; and

FIG. 4 is a diagrammatic view of the manner in which the electric solenoid of the anti-theft device is electrically connected to the accessory terminal of a conventional automotive ignition switch.

Figure 1:
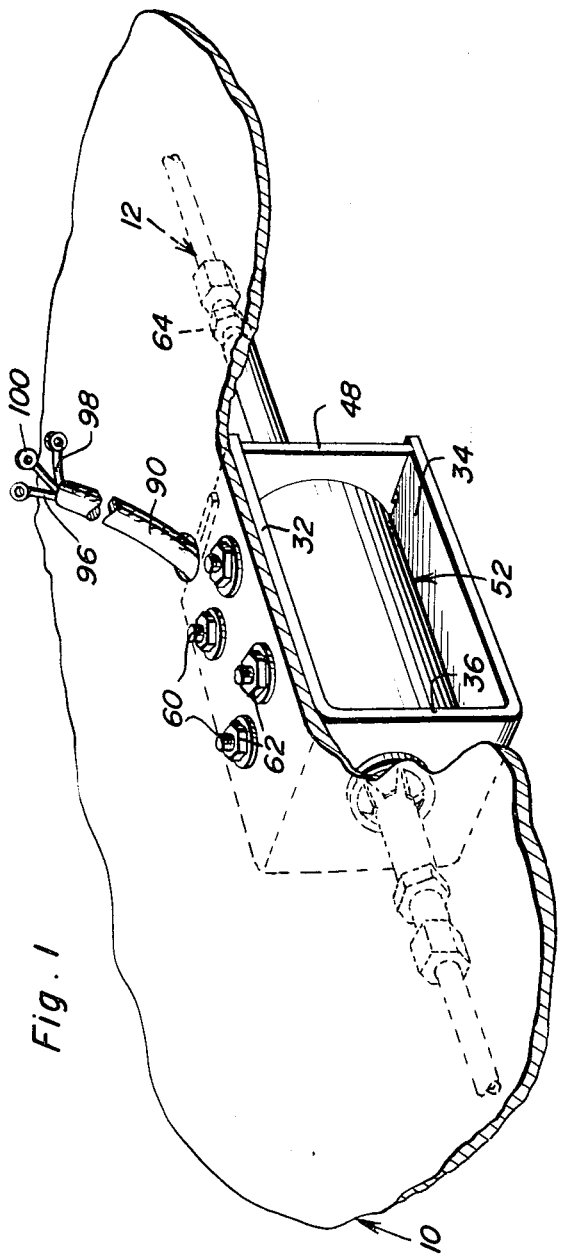
FIG. 1 is a fragmentary perspective view of a typical installation of the anti-theft device as installed in a motor vehicle fuel line.

Referring now more specifically to the drawings the numeral 10 generally designates a flooring portion of a conventional form of motor vehicle including a liquid fuel and air mixture burning combustion engine (not shown). The vehicle 10 further includes a liquid fuel line 12 for conveying liquid fuel from a fuel tank to the associated internal combustion engine and the vehicle further includes an ignition switch 14 including an input terminal 16 and ignition, starter solenoid and accessory terminals 18, 20 and 22, respectively. A conductor 24 extends from a suitable source 26 of electrical potential to the terminal 16.

The anti-theft device of the instant invention is referred to in general by the reference numeral 28 and includes a case referred to in general by the reference numeral 30 which may be constructed of steel or other suitable material. The case 30 is generally channel-shaped in configuration and includes a pair of generally parallel upper and lower walls 32 and 34 notched at one pair of corresponding ends as at 32' and 34' and joined together at the other pair of corresponding ends by means of an integral end wall 36 extending therebetween. The end wall 36 is provided with a central aperture 38 and a removable end wall 40 including a pair of anchor tabs 42 and 44 is positioned between the notched ends of the walls 32 and 34 with the tabs 42 and 44 received in the notches 32' and 34'. The wall 40 is centrally apertured as at 48 and a cylindrical winding body 50 of a solenoid assembly referred to in general by the reference numeral 52 is disposed between the walls 36 and 40 and between the walls 32 and 34. The body 50 defines a longitudinal bore 54 extending therethrough which is registered with the bores 38 and 48 and the body includes both 6-volt and 12-volt windings 56 and 58 disposed about the bore 54.

The upper wall 32 includes a plurality of upwardly projecting studs 60 and the flooring portion 10 is provided with a plurality of apertures (not shown) formed therethrough upwardly through which the studs 60 are secured by means of threaded nuts 62. In this manner, the body or case 30 is secured beneath an unobtrusive floor portion or panel 10 of the associated vehicle at least somewhat in registry with the fuel line 12.

A section of the fuel line 12 is removed and the adjacent ends of the remaining sections of the fuel line 12 have fittings 64 and 66 secured thereto. The fittings 64 and 66 have through bores formed therethrough and the fitting 64 includes a counterbore 68. In addition, the adjacent ends of the fittings 64 and 66 are externally threaded as at 70 and a brass or nylon tube 72 is disposed through the bore 54 and the apertures or bores 38 and 48 and has its opposite ends threadedly engaged over the externally threaded adjacent ends of the fittings 64 and 66 whereby the tube 72 joins the adjacent ends of the fuel line sections 12.

A pair of Tinnerman nuts 74 and 76 are engaged with the outer surface portions of the tube 72 and abutted against the outer surfaces of the end walls 36 and 40 whereby the end wall 40 is secured to the case 30 and the tube 72 is prevented from shifting longitudinally relative to the case 30.

Figure 2:
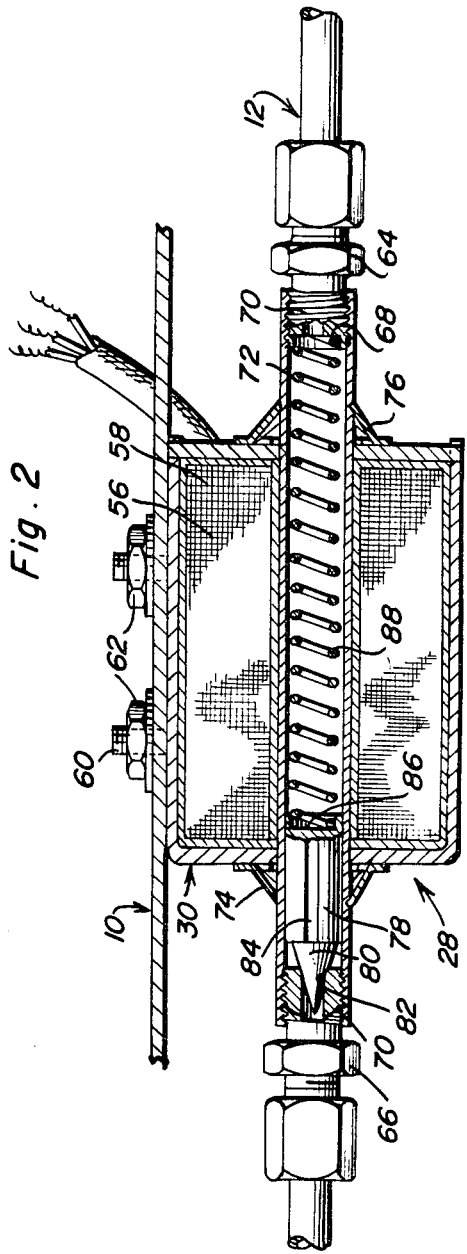
FIG. 2 is an enlarged fragmentary longitudinal vertical sectional view taken substantially upon a plane passing through the center of the anti-theft device illustrated in FIG. 1.

The tube 72, while comprising an integral portion of the fuel line 12, also comprises a portion of the solenoid assembly 52 and includes a slidable armature 78 reciprocal longitudinally therein and also provided with a conical head 80 on one end seatingly engageable in a conical seat 82 formed in the fitting 66. The armature 78 includes longitudinally extending circumferentially spaced grooves 84 and the end of the armature 78 remote from the conical head 80 defines a shallow blind bore 86 in which one end of a compression spring 88 is seated. The other end of the compression spring 88 is seated in the counterbore 68 and accordingly, the spring 88 serves to yieldingly urge the armature 78 to the position thereof illustrated in FIG. 2 of the drawings with its conical head 80 seated against the seat 82 and thereby preventing the flow of fuel through the line 12 in a direction extending from the fitting 64 to the fitting 66. However, the armature 84 is of course constructed of a material which is attracted to an electromagnet and accordingly, when either the windings 56 or the windings 58 are energized, the armature 84 is withdrawn from the seat 82 and shifted to the right as viewed in FIG. 2 of the drawings so as to allow the passage of fuel from the fitting 68, through the tube 72 and through the fitting 66 toward the engine of the associated vehicle.

A three conductor wire 90 extends outwardly from the body 54 and includes a first input conductor 96 for the windings 56, a second input conductor 98 for the windings 58 and a common ground conductor 100.

In operation, if the source 26 comprises a source of 6-volt potential, the conductor 96 is electrically connected to the terminal 22 whereby whenever the ignition switch 14 is turned on the 6-volt windings of the body 50 will be energized so as to withdraw the armature 84 from the seat 82 and allow fuel to pass through the fuel line 12 to the associated internal combustion engine. Of course, the conductor 100 is suitably grounded as at 102 and if the source 26 comprises a 12-volt source, the conductor 98 is electrically connected to the terminal 22 in lieu of the conductor 96.

In this manner, should a thief "hot-wire" the ignition circuit of the associated internal combustion engine and manage to successfully start the engine, the solenoid assembly 52 will not be actuated since the accessory terminal of the ignition switch 14 is not electrically actuated merely by "hot-wiring" the ignition circuit. Therefore, although a potential thief may be able to start the internal combustion engine and move the associated vehicle for a short distance, nonactuation of the solenoid assembly 52 will cause the engine of the vehicle to be deprived of liquid fuel and to therefore soon stall for lack of fuel. Of course, a thief intending to steal the vehicle would be discouraged from further attempts at stealing the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle fuel line including a nonmagnetic section thereof including inlet and outlet end portions, a valve seat in said section through which fuel flowing through said line passes, a valve member reciprocal in said section past which fuel may flow when said valve member is spaced axially of said section from said seat, said valve member being shiftable into engagement with said seat to block the flow of fuel therepast, means yieldingly urging said valve member toward seated engagement with said seat, said valve member being constructed of magnetic material, and electromagnetic means disposed exteriorly of said section and operative when electrically actuated, to magnetically draw said valve member along said section out of seated engagement with said seat, said electromagnetic means comprising a cylindrical winding body through which said section of said fuel line extends with said section of said fuel line being disposed generally concentric with the center axis of said cylindrical winding body, said cylindrical winding body including both 6-bolt and 12-windings.

2. The combination of claim 1 wherein said valve seat is disposed in the outlet end portion of said nonmagnetic section of said fuel line.

3. In combination, a vehicle including an ignition switch, a fuel line, a normally closed control valve operatively associated with said line for controlling the flow of fuel therethrough, an electrically actuatable control for said control valve and operative to open said valve when electrically actuated, and means electrically connecting said control to said ignition switch, said control valve including a magnetic valve member movable between open and closed positions and yieldingly biased toward a closed position, said control including an electromagnet operatively associated with said valve member for retracting the latter from its closed position in response to electrical actuation of said electromagnet, said electromagnet including both 6-volt and 12-volt windings for actuation of said electromagnet from either a 12-volt source of electrical potential or a 6-volt source of electrical potential.

4. In combination, a vehicle including an ignition switch of the type including both ignition and accessory terminals, a fuel line, a normally closed control valve operatively associated with said line for controlling the flow of fuel therethrough, an electrically actuatable control for said control valve and operative to open said valve when electrically actuated, means electrically connecting said control to said accessory terminal of said ignition switch, said control valve including a magnetic valve member movable between open and closed positions yieldingly biased toward a closed position, said control including an electromagnet operatively associated with said valve member for retracting the latter from its closed position in response to electrical autuation of said electromagnet, said fuel line including a nonmagnetic section thereof in which said valve member is reciprocal between open and closed positions, said electromagnet comprising a cylindrical winding body disposed about said nonmagnetic section.

5. The combination of claim 4 wherein said nonmagnetic section of said fuel line is normally well hidden from view.

* * * * *